United States Patent [19]

Harju

[11] Patent Number: 4,820,348

[45] Date of Patent: Apr. 11, 1989

[54] PROCESS FOR THE SPECIFIC SEPARATION OF LACTOSE FROM MILK

[75] Inventor: Matti Harju, Nummela, Finland

[73] Assignee: Yalio Meijerien Keskusosussliike, Helsinki, Finland

[21] Appl. No.: 930,505

[22] Filed: Nov. 12, 1986

[30] Foreign Application Priority Data

Nov. 14, 1985 [FI] Finland ................................. 854485

[51] Int. Cl.⁴ .......................... C13D 3/14; C13K 5/00; B01D 59/30
[52] U.S. Cl. .................................. 127/46.2; 127/46.3; 127/31; 426/271; 426/491; 530/417; 530/366
[58] Field of Search ............................ 127/46.2, 46.3; 426/271, 491; 530/417, 366

[56] References Cited

U.S. PATENT DOCUMENTS

| | | | |
|---|---|---|---|
| 2,708,632 | 5/1955 | Stimpson | 127/46.2 |
| 2,778,750 | 1/1957 | Hull | 127/46.2 |
| 3,547,900 | 12/1970 | Dienst et al. | 530/378 |
| 3,969,337 | 7/1976 | Lauer et al. | 530/416 |
| 3,969,538 | 7/1976 | Schwengers | 426/491 |
| 4,543,261 | 9/1985 | Harmon | 426/271 |

Primary Examiner—H. M. S. Sneed
Assistant Examiner—Chung K. Pak
Attorney, Agent, or Firm—Kenyon & Kenyon

[57] ABSTRACT

The invention relates to a process for accomplishing specific chromatographic separation of lactose from milk. Milk is treated in a column with a cation exchange resin balanced in such a manner that its cationic composition corresponds to the cationic composition of milk at a temperature of about 50° to about 80° C., and the column is eluted with water to recover a protein containing fraction and lactose fraction.

9 Claims, No Drawings

PROCESS FOR THE SPECIFIC SEPARATION OF LACTOSE FROM MILK

FIELD OF THE INVENTION

The present invention relates to a process for accomplishing specific chromatographic separation of lactose from milk.

BACKGROUND OF THE INVENTION

In the production of cheese, curd, and milk protein powders, a process stage of essential importance is the separation of the main components of milk from each other, i.e. the separation of fat and protein—or in fatless products the separation of protein only—from lactose. Traditionally, this has been carried out by precipitating casein or a mixture of casein and fat by means of a rennet enzyme or by adjusting the pH by means of an acid to the isoelectric point (pH about 4.5). Whey proteins as well as lactose and salts normally remain in the solution, i.e. the whey.

Consequently, several processes have been developed for improving the protein yield. By the use of heat treatment or calcium addition, the whey proteins are caused to precipitate with casein. Besides lactose and salts, only low molecular weight nitrogenous compounds remain in the solution part. The utilization of this kind of proteinless whey is very difficult.

New processes have been developed besides the precipitation processes. In the early 1970's, the gel filtration was believed to offer a satisfactory technical solution to the recovery of milk proteins in a soluble form (U.S. Pat. No. 3,547,900). In the gel filtration, the protein fraction of milk is separated from the lactose and the salt of milk. However, the industrial applications of the process have been prevented by the high price and difficulties in the treatment of the gel material as well as hygiene problems.

The ultrafiltration, process also developed in the 1970's, and has been applied industrially especially in the production of Feta cheese, curd, and a whey protein powder. The most important reason why the ultrafiltration has not become more general is that its byproduct, permeate, is difficult to utilize. The permeate contains the components which have gone through the ultrafiltration membrane, such as lactose, salts, and low molecular weight nitrogenous compounds. Another problem with ultrafiltration is that it is very difficult as well as expensive to obtain a high protein content (over 80 per cent of the dry substance).

Unexpectedly, it has now been found that the chromatographic separation makes it possible to fraction milk in such a manner that lactose is separated as a pure fraction while the salts remain in the protein fraction or in the protein/fat fraction. In this way a fraction nearly free from lactose and having a high protein content is obtained; on the other hand, a pure lactose solution much easier to utilize is obtained in place of the permeate. If the salts in the protein fraction are disadvantageous in view of the intended use, the protein fraction can be concentrated by ultrafiltration in place of evaporation, so that the salts are removed together with water.

Chromatographic separation by means of a cation exchange resin is a process known per se and it is an industrially applied process e.g. for the separation of saccharose from molasses and for the separation of fructose from a mixture of glucose and fructose. U.S. Pat. No. 3,969,337 describes the chromatographic fractionation of whey by means of a cation exchange resin. However, the treatment of milk includes many problems different from those connected with the treatment of whey; e.g. the susceptibility of casein to precipitate, the preservation of the micellic structure of casein, the behaviour of fat, and the extremely high hygiene requirements. Therefore, this per se known process for the separation of whey cannot be applied in the treatment of milk.

SUMMARY OF THE INVENTION

So the invention is concerned with an improved, hygienic, industrially applicable process for accomplishing specific chromatographic separation of lactose from milk, said process comprising the steps of (a) packing a column with a particulate cation exchange resin, (b) balancing said cation exchange resin in such a manner that its cationic composition corresponds to the cationic composition of milk, (c) treating milk in a column with said balanced cation exchange resin at a temperature of about 50° to about 80° C., and (d) eluting the column with water to recover successively a protein containing fraction and lactose fraction from the bottom of the column.

DETAILED DESCRIPTION OF THE INVENTION

The cation exchange resin can be e.g. a strong cation exchange resin manufactured by Suomen Sokeri Oy (a resin having a polystyrene divinyl benzene backbone and containing sulphonic acid groups). The resin has a structure of the same type as e.g. the resin "Duolite C 204 F" (manufacturer Duolite International S.A.), and it is used industrially for the separation of saccharose from molasses. A suitable mean particle size of resin is 0.06 to 0.6 mm. Preferably the mean particle size of resin is 0.4 mm. The column is filled with resin in the sodium salt form. The resin is balanced so that it obtains a balance with milk with respect to its ionic form. When the resin is balanced, fatless milk or concentrated milk is passed through the resin bed in an amount at least 10 times the volume of the resin bed. The balancing of resin can also be carried out by means of a salt solution the cationic composition of which corresponds to that of milk.

For example, a water and salt solution can be prepared from a salt mixture containing calcium chloride, potassium chloride, sodium chloride, and magnesium chloride. The concentrations of said salts in the water solution are as follows:

| Salt | Concentration |
| --- | --- |
| $CaCl_2.2H_2O$ | 53.5 g/l |
| KCl | 23.1 g/l |
| NaCl | 8.5 g/l |
| $MgCl_2.6H_2O$ | 15.1 g/l |

In the balancing of the resin, preferably one column volume of the water solution prepared from the salt mixture as described above is passed through the resin bed.

If the chromatographic separation is carried out by means of a resin in the calcium form, milk is precipitated when it comes into contact with the resin, and the column is clogged. On the other hand, if the resin is in the sodium form, the micellic structure of casein is broken, and the casein dissolves into a sodium caseinate form. Milk thereby becomes transparent in appearance, and at the same time the taste and other properties thereof change.

In contrast, the casein preserves its micellic structure, but is not precipitated when a balanced cation exchange resin is used according to the present invention for the chromatographic treating of milk.

In the treatment of milk, an extremely high hygiene is required. In general, this can be effected by a suitable choice of the pH and temperature.

In the process according to the invention, the pH cannot be adjusted to any greater degree, because it is of advantage to keep the milk proteins in the anionic form (pH over 5) so as to prevent them from adhering to the resin.

The temperature must be such that no bacterial growth occurs in the milk. For instance, the temperature used in the process for the chromatographic treatment of whey stated in U.S. Pat. No. 3,969,337, i.e. 20° C., is impossible in practice because it is thereby not possible to control the bacterial growth. The ultrafiltration, in turn, aims at as high temperatures as possible, although the resistance of the membranes sets the upper limit to about 50° to 55° C. At these temperatures the bacterial growth is already clearly slower than at 20° C. In the chromatographic treatment of milk, the starting point, however, is that no growth at all is allowed, and the microbiological quality should preferably be improved. It has been found that this is achieved by carrying out the chromatographic separation at a temperature within the range from 50° to 80° C., the preferred temperature range being from 55° to 70° C. Even chromatographing temperatures exceeding 80° C. are possible in view of the resistance of resin; however, the whey proteins contained in milk start to denaturate at such temperatures, as a result of which their properties change.

The process according to the invention is suitable for the treatment of both fatless and fatty milk, because the milk fat melts completely at temperatures exceeding 40° C. Unexpectedly the separation of lactose from fatty milk takes place as specifically as from fatless milk. Thereby the fat, proteins and salts are separated as one fraction and the lactose as another.

The water and waste water costs of the process according to the invention are extremely low, because the elution can be carried out with condensation water coming from the evaporator when milk is concentrated by evaporating before the chromatographic separation. The condensation water is more suitable for elution than tap water, because the salt content thereof is very low. If the fractions are concentrated by evaporating, the same water can be circulated in the process. With the exception of the washing of the column, the process does not produce waste water to any grater degree. Test results show that the interval between two washings can be several days, provided that a daily washing is not required e.g. by legislation.

The energy costs of new evaporators based on the mechanical compression of steam are so low that the only major disadvantage of the chromatographic separation, i.e., dilution, does not notably affect the profitability of the process.

In the process, the chromatography column can be charged with fairly large amounts of milk so that the dilution is insignificant.

In practice, a suitable ratio of the volume of the milk to be treated to the column of the balanced cation exchange resin contained in the column is from about 1:200 to about 1:4, preferably from about 1:50 to about 1:5.

The following examples are illustrative of the invention.

EXAMPLE 1

A column having a height of 100 cm and a diameter of 1.6 cm was filled with a strong cation exchange resin manufactured by Suomen Sokeri Oy and having a structure of the same type as, e.g., Duolite C 204 F (Duolite International S.A.). The mean particle size of the resin was 0.4 mm. The resin volume of the column after it was ready packed was 160 ml. The column was provided with a heating jacket by means of which the temperature was maintained at 65° C. Two liters of fatless milk was first pumped through the column for the achievement of an ionic balance. After a flushing with water, 5 ml of fatless concentrated milk (pH adjusted to 6.7 with NaOH, the dry solids content 27% by weight) was fed into the column. The elution was carried out with demineralized water. The flow rate was 150 ml/h. The fractions were gathered every two minutes. The fractionation of fatless milk under these conditions is presented in Tables 1 and 2.

TABLE 1

Fractionation of fatless concentrated milk under the conditions of Example 1

| Sample | Protein (%) | Lactose (%) | Conductivity (mS/cm) |
| --- | --- | --- | --- |
| Feed | 9.4 | 13.5 | 23.2 |
| Fraction 1 | 0.1 | — | — |
| Fraction 2 | 1.4 | — | 2.5 |
| Fraction 3 | 2.3 | — | 5.1 |
| Fraction 4 | 2.3 | — | 6.7 |
| Fraction 5 | 1.8 | 0.0 | 7.1 |
| Fraction 6 | 1.3 | 0.1 | 5.8 |
| Fraction 7 | 0.2 | 0.5 | 3.2 |
| Fraction 8 | 0.0 | 1.8 | 0.9 |
| Fraction 9 | — | 2.6 | 0.0 |
| Fraction 10 | — | 3.3 | — |
| Fraction 11 | — | 2.6 | — |
| Fraction 12 | — | 2.2 | — |
| Fraction 13 | — | 0.4 | — |
| Fraction 14 | — | 0.0 | — |

TABLE 2

Distribution of the other components of fatless milk into a protein and a lactose fraction under the conditions of Example 1

| | Ash (%) | Ca mg/l | K mg/l | Na mg/l | P mg/l | Cl mg/l | Citric acid (g/l) |
| --- | --- | --- | --- | --- | --- | --- | --- |
| Protein fraction (fractions 2 to 7) | 0.42 | 610 | 410 | 890 | 490 | 740 | 1.0 |
| Lactose Fraction (fractions 8 to 12) | 0.02 | 10 | 11 | 26 | 15 | 130 | 0.0 |

EXAMPLE 2

The test arrangements were the same as in Example 1 except that now 2 ml of concentrated milk (dry content 36% by weight) prepared from whole milk (3.9% fat) was fed into the column containing the balanced cation exchange resin. The results are shown in Table 3.

TABLE 3

Fractionation of fatty concentrated milk under the conditions of Example 2

|  | Protein (%) | Fat (%) | Lactose (%) | Conductivity (mS/cm) |
|---|---|---|---|---|
| Feed | 9.2 | 10.5 | 14.0 | 22.0 |
| Fraction 1 | 0.1 | 0.1 | — | 0.12 |
| Fraction 2 | 0.7 | 0.6 | — | 1.5 |
| Fraction 3 | 1.1 | 0.9 | — | 3.4 |
| Fraction 4 | 1.1 | 1.4 | — | 4.1 |
| Fraction 5 | 0.6 | 0.9 | 0.05 | 0.33 |
| Fraction 7 | 0.03 | 0.06 | 0.6 | 0.21 |
| Fraction 9 | — | — | 1.3 | — |
| Fraction 10 | — | — | 1.4 | — |
| Fraction 11 | — | — | 1.3 | — |
| Fraction 12 | — | — | 0.6 | — |
| Fraction 13 | — | — | 0.2 | — |
| Fraction 14 | — | — | 0.05 | — |

EXAMPLE 3

The test arrangements were the same as in Example 1 except that 15 ml of fatless concentrated milk (dry solids content 29% by weight) was fed into the column containing the balanced cation exchange resin. As appears from Table 4, the separation was still fairly good, and the dilution insignificant.

TABLE 4

Fractionation of fatless concentrated milk

|  | Protein (%) | Lactose (%) | Conductivity (mS/cm) |
|---|---|---|---|
| Feed | 10.7 | 15.5 | 26.2 |
| Fraction 1 | 0.04 | — | 0.07 |
| Fraction 2 | 1.5 | — | 1.3 |
| Fraction 3 | 5.2 | — | 5.0 |
| Fraction 4 | 5.7 | — | 6.9 |
| Fraction 5 | 6.0 | 0.09 | 8.5 |
| Fraction 6 | 4.9 | 0.2 | 10.3 |
| Fraction 7 | 3.8 | 0.7 | 12.8 |
| Fraction 8 | 3.0 | 1.3 | 14.1 |
| Fraction 9 | 1.6 | 1.8 | 13.4 |
| Fraction 10 | 0.3 | 3.1 | 7.2 |
| Fraction 11 | 0.1 | 5.7 | 2.2 |
| Fraction 12 | — | 9.1 | — |
| Fraction 13 | — | 9.7 | — |
| Fraction 14 | — | 8.0 | — |
| Fraction 15 | — | 4.3 | — |
| Fraction 16 | — | 1.9 | — |
| Fraction 17 | — | 0.6 | — |

EXAMPLE 4

The hygiene of the separation column was observed by determining the microbe amounts of fractions obtained from the column by means of the total colony determination. The influence of temperature was clearly brought out when fatless concentrated milk of low quality was chromatographed at 50° C. and 65° C. with the test arrangements of Example 1. Table 5 shows the results of the first run. With a longer run at 50° C., the column was contaminated even more clearly, whereas the column remained clean at 65° C.

TABLE 5

The influence of temperature on the microbiological quality of the fractions

|  | Total number of colonies (per ml) | |
|---|---|---|
|  | 50° C. | 65° C. |
| Feed | 16.000.000 | 16.000.000 |
| Protein fraction (fractions 2 to 7) | 1.600.000 | 8.500 |
| Lactose fraction (fractions 8 to 12) | 11.000 | 1.600 |
| Water fraction after lactose | 1.700 | 190 |

TABLE 5-continued

The influence of temperature on the microbiological quality of the fractions

|  | Total number of colonies (per ml) | |
|---|---|---|
|  | 50° C. | 65° C. |
| (fractions 18 to 22) |  |  |

EXAMPLE 5

The balancing of resin by means of a salt mixture corresponding to the cationic composition of milk:

A water solution was prepared from a salt mixture containing calcium chloride, potassium chloride, sodium chloride, and magnesium chloride. The concentration of said salts in the water and salt solution were as follows:

| Salt | Concentration |
|---|---|
| $CaCl_2.2H_2O$ | 53.5 g/l |
| KCl | 23.1 g/l |
| NaCl | 8.5 g/l |
| $MgCl_2.6H_2O$ | 15.1 g/l |

The resin used in Example 1 was balanced similarly as in Example 1 except that the balancing was carried out by using, instead of fatless milk, one column volume of the water solution prepared from the salt mixture as described above.

When the separation of lactose from milk was carried out with a resin balanced in this way, the results obtained were similar to those obtained with a resin balanced with milk.

I claim:

1. A process for accomplishing specific chromatographic separation of lactose from milk, said process comprising the steps of
   (a) packing a column with a particulate cation exchange resin,
   (b) balancing said cation exchange resin by passing fatless milk through the cation exchange resin in an amount of at least ten times the volume of the resin,
   (c) flushing the resulting balanced cation exchange resin with water,
   (d) treating fatless feed milk in a column with said balanced cation exchange resin at a temperature of about 50° to about 80° C., and
   (e) eluting the column with water to recover successively a protein containing fraction and lactose fraction from the bottom of the column.

2. A process according to claim 1, wherein the chromatographic separation is carried out at a temperature of about 55° to about 70° C.

3. A process according to claim 2, wherein the cation exchange resin is a resin having a polystyrene divinyl benzene backbone containing sulphonic acid groups.

4. A process according to claim 3, wherein the pH of the feed milk is over 5.

5. A process according to claim 4, wherein the fatless milk is concentrated milk having a dry solids contents of at least 20% by weight.

6. A process according to claim 1, wherein the ratio of the volume of the milk to be treated to the volume of the balanced cation exchange resin contained in the column is from about 1:50 to about 1:5.

7. A process according to claim 1, wherein the ratio of the volume of the feed milk to be treated to the volume of balanced cation exchange resin contained in the column is from about 1:200 to about 1:4.

8. The process according to claim 1 further comprising the step of concentrating the feed milk by evaporation and the elution step (d) is carried out with evaporated water from the concentration step.

9. The process according to claim 1, wherein the mean particle size of the resin is between about 0.06 to 0.6 mm.

* * * * *

UNITED STATES PATENT AND TRADEMARK OFFICE
CERTIFICATE OF CORRECTION

PATENT NO. : 4,820,348
DATED : April 11, 1989
INVENTOR(S) : Matti Harju

It is certified that error appears in the above-identified patent and that said Letters Patent is hereby corrected as shown below:

On the title page for the Assignee, change:

"Yalio" to --Valio--.

"Keskusosussliike" to --Keskusosuusliike--.

Signed and Sealed this

Twenty-seventh Day of February, 1990

Attest:

JEFFREY M. SAMUELS

Attesting Officer          Acting Commissioner of Patents and Trademarks